Patented Sept. 19, 1950

2,523,150

UNITED STATES PATENT OFFICE 2,523,150

RESINOUS COPOLYMERS OF DIOLEFINS WITH REFINERY C₄ CUTS

Helmuth G. Schneider, Westfield, and David W. Young, Roselle, N. J., assignors to Standard Oil Development Company, a corporation of Delaware No Drawing. Application September 28, 1946, Serial No. 700,180

4 Claims. (Cl. 260—82)

This invention relates to copolymers of a multi-olefin with a mono-olefin; it relates particularly to resinous copolymers of relatively high unsaturation and relates particularly to unsaturated resinous polymers prepared from mixtures of a multi-olefin such as butadiene with a mono-olefin derived from an impure $C_4$ refinery cut.

It has been found possible to prepare an extremely valuable synthetic resin which is particularly useful as a component in paints and varnishes because of its capability of "cooking" with linseed oil in the varnish making procedure. This resin in the past has been prepared from a mixture of from 40% to 80% butadiene or other multiolefin, with a mono-olefin having from 5 to 20 carbon atoms per molecule or a normal olefin having from 3 to 20 carbon atoms per molecule; isobutylene having been found unusable because of its very high reactivity and its tendency to polymerize first into an elastomer or heavy oil rather than into a hard resin.

According to the present invention it is now found that a mixture of a multi-olefin such as butadiene can be prepared with the unpurified refinery $C_4$ cut containing isobutylene, the several normal butenes, small amounts of propylene and considerable quantities of butane with traces of other saturates and unsaturates. By the use of such a crude mixture of saturates and unsaturates in combination with the multi-olefin, an extremely valuable polymerization reaction can be obtained at temperatures ranging from $+15°$ C. down to about $-35°$ C. by the application to the cooled mixture of a Friedel-Crafts catalyst in solution in a low-freezing non-complex-forming solvent to yield a hard resin which is a non-elastomer, of relatively high unsaturation, which is soluble both in hydrocarbon oils and in linseed oil and other varnish base oils to yield a solution which can be given the standard varnish "cook" to produce an excellent paint or varnish base; as well as many other important uses.

Thus the invention mixes together a substantial portion of a multi-olefin such as butadiene with a crude refinery $C_4$ cut, with or without $C_3$ and $C_5$ unsaturates and saturates, cools the mixture moderately and polymerizes it by the application of a Friedel-Crafts catalyst in solution in a low-freezing non-complex-forming solvent, to yield a hard resin. Other objects and details of the invention will be apparent from the following description.

In practicing the invention the first component of the mixture to be prepared is a multi-olefin. The preferred multi-olefin is butadiene but any of the organic compounds containing more than one unit of unsaturation; that is more than one carbon to carbon double linkage, with from 4 to about 14 carbon atoms per molecule is useable without regard to the presence or absence of substituents in or on the carbon chain. Alternatively to butadiene, such substances as isoprene, piperylene, dimethyl butadiene, myrcene, alloocymene, methyl pentadiene, cyclo pentadiene or mixtures of two or more thereof and the like, may be used as well as such things as the olefinic ethers, the olefinic cyclo-compounds (as distinguished from the aromatics), and the like. This material is present in the polymerization mixture in the proportion of from 40% to 80% of the total unsaturates.

The second component of the mixture is a crude $C_4$ cut. Representative crude $C_4$ cuts may contain approximately the following substances in the proportions by weight indicated:

| | |
|---|---|
| Propylene | 0.1% |
| Propane | 1.6% |
| Butane | 18.3% |
| Isobutane | 35.2% |
| Isobutylene | 15.9% |
| Normal butenes | 27.6% |
|     Butene-1 | 12.2% |
|     t-Butene-2 | 9.2% |
|     c-Butene-2 | 6.2% |
| Butadiene | 0.3% |
| +$C_5$ cut | 0.6% |

This mixture may be used as such, or it may be modified by the addition of further portions of normal butylene or by the addition of further portions of a $C_3$ cut or a $C_5$ cut. A representative $C_3$ cut may contain the following substances in the proportions indicated:

| | Per cent |
|---|---|
| Propane | 85–70 |
| Propylene | 15–30 |

(The $C_3$ cut may contain, in addition, small amounts of ethylene and ethane, usually less than 2 or 3%, and may also contain traces, usually less than 2 or 3%, of $C_4$ substances, as shown in the above table.)

Similarly representative $C_5$ cuts may contain:

| | Per cent |
|---|---|
| Mixed pentane | 72 |
| Mixed pentene | 28 |

The $C_5$ cut also may contain small percentages, usually less than 5%, of various of the $C_4$ substances, and may, on occasion, contain similar small amounts of $C_6$ substances, depending upon how carefully the various cuts are prepared.

The $C_4$ cut is desirably present in any mixture prepared but to it may be added substantial amounts of other cuts, usually without too much regard for the molecular weight of the unsaturates included. A substantial portion of $C_3$ cut is particularly advantageous, since it brings into the mixture a substantial portion of propane which serves as an excellent refrigerant, and it is usually desirable to add extra portions of propane to bring the operating temperature of the mixture to the desired value. It may be noted that the $C_4$ cut contains a considerable proportion of isobutylene, which is not normally useable for the production of a hard resin, because of its very high reactivity. In the presence of the other substances above listed, however, the isobutylene polymerizes readily from the mixture into the desired hard resin. It may be noted that a maximum amount of isobutylene which can be present in the polymerization mixture and still yield a hard resin copolymer is about 35%. The amount of isobutylene then may be any lower amount down to the merest traces, or the $C_4$ cut stripped of isobutylene may be used as such, if desired, although for the most desirable polymer and polymerization conditions, it is usually advantageous to have at least 10% of isobutylene present, since the normal butenes do not copolymerize as readily as the butadiene and a less well balanced polymerization reaction may occur. In the tables above set forth specific values are given, but these are representative only, and changes in refinery practice produce substantial variations in the amounts, these variations occasionally being as great as half or double the values given.

This mixture is desirably held at a temperature within the range between about +15° and about —35° C.; the most satisfactory temperatures usually lie between about —5° C. and —25° C.

This temperature may be obtained in any convenient way such as by a refrigerating jacket upon the reactor in which a convenient refrigerant is placed; such substances as liquid propane, liquid ethane, liquid or solid carbon dioxide, occasionally liquid ethylene, liquid ethyl or methyl chloride especially under pressure or vacuum as desired, liquid sulfur dioxide, liquid ammonia or one or more of the various normal fluoro alkyls having a proper boiling point. With any of these refrigerants the temperature obtained is readily adjusted by the use of pressure or vacuum on the jacket.

Alternatively, and preferably, the cooling is obtained by an "internal refrigerant" the preferred refrigerant being liquid propane, and the polymerization is conducted in a reactor equipped with a reflux condenser which may be strongly cooled by any convenient refrigerant such as liquid ethylene, liquid ethane, or liquid ammonia or liquid carbon dioxide or the like as above listed. This procedure permits of the adjustment of the temperature of the mixture by the addition of more or less of the low boiling refrigerant and with propane a convenient amount yields a highly desirable and effective temperature which is accurately maintained because of the fact that refrigeration is added to the mixture only as fast as propane is boiled out and recondensed in the reflux condenser. The operation of the reflux condenser system is well shown in the copending application of Garber, Young and Sparks, Serial No. 604,350, filed July 11, 1945, which is incorporated hereinto by reference. The mixture is desirably strongly stirred by a powerful stirrer, preferably a propeller type in order to maintain the mixture in as homogeneous a condition as possible and to stir in the catalyst as rapidly as possible.

The mixture is then polymerized by the addition of a Friedel-Crafts catalyst which is preferably in solution in a low-freezing non-complex-forming solvent. The catalyst is preferably added in the form of a fine high pressure jet into the body of the rapidly stirred cooled olefinic mixture. It is usually preferable to avoid the presence of catalyst in any form in the space above the liquid surface, since this space contains more or less volatilized multi-olefin or volatilized butadiene which is polymerized from the gaseous phase into an insoluble, infusible simple polymer called by the plant workmen "popcorn" which is useless and a waste of material.

The preferred catalyst is aluminum chloride with boron trifluoride and titanium tetra chloride as second choice and just about as good. However, any of the Friedel-Crafts catalyst substances disclosed by N. O. Colloway in his article on "the Friedel-Crafts Synthesis" printed in the issue of "Chemical Reviews" published for the American Chemical Society at Baltimore in 1935, in Volume XVII, No. 3, the article beginning on page 327, the list being particularly well shown on page 375, may be used. In addition a considerable range of active metal halide double salts are highly useful and effective, including such substances as aluminum chloro bromide, aluminum chloro-alk-oxide and many other analogous compounds both of aluminum and of the other active metals.

The Friedel-Crafts catalyst is preferably used in solution in a low-freezing non-complex-forming solvent such as ethyl or methyl chloride, or with the hydrocarbon soluble compounds such as aluminum bromide or aluminum chloro bromide, the lower boiling hydrocarbons are effective solvents including propane, butane, pentane and the like. Similarly effective solvents are such compounds as carbon disulfide, methylene dichloride, chloroform, ethylene dichloride, ethyl trichloride, and various other of the mono and poly substituted aliphatics which for the purpose of this specification are included in the broad term "alkyl halides" which term is defined as including any mono or poly halo substituted aliphatic group. For the purpose of this specification, the catalyst solvent is defined as low-freezing, if it has a freezing point below the polymerization temperature and is non-complex-forming when it does not separate from solution containing the active metal halide, upon evaporation of the solvent, a compound between the solvent and the Friedel-Crafts catalyst, or is non-complex-forming when the addition of the solvent in the form of a vapor to the catalyst at constant temperature will lead to a substantially continuous change in the composition of the catalyst phase and to a continuous increase in the partial pressure of the solvent in the solution.

The polymerization reaction may begin immediately upon the addition of the catalyst or it may be more or less long continued requiring several hours for completion, depending upon the choice of materials and the rate at which the catalyst is added. It may be noted that an amount of catalyst ranging from 0.5% (of the total weight of unsaturates present) to about 5% may be required, depending upon the presence or absence of catalyst poisons and depending also upon the percentage of total unsaturates to be polymerized. It is usually undesirable to carry the polymerization of the unsaturates to 100% completion because of the difference in rate of polymerization of the various components; and accordingly, usually enough catalyst is added to polymerize no more than from 60 to 75% of the total amount of unsaturates present. This procedure has the additional advantage that the polymer remains in solution in the diluent and refrigerant and in part in catalyst solvent to yield a material which is sufficiently fluid to flow out from the reactor.

When the polymerization has reached the desired stage, the polymer may be recovered in any desired manner. A convenient procedure is to discharge the cooled fluid polymer solution from the polymerization reactor into either warm water or warm naphtha. In warm water, the volatiles are driven out and a slurry of resin in water is obtained in which the water effectively hydrolizes and washes out the Friedel-Crafts catalyst, and the resin is readily separated by a straining or filtration step, followed by any convenient drying step. If the polymer solution is discharged into warm naphtha, the resin dissolves in the naphtha and the volatiles are largely driven out; in either instance the volatiles being recovered and reused for further polymerizations. If a naphtha solution is prepared by dissolving the reactor effluent in naphtha, the dry resin is conveniently recovered by flashing off the naphtha in a device of the sort disclosed by Tyson in U. S. Patent No. 2,235,127, the disclosure of which is herewith made a part of the present disclosure.

The polymer obtained is a clear white or more or less yellow hard resin characterized by a chonchoidal fracture. The resin usually has a relatively high unsaturation, indicated by an iodine number (measured by the Wijs method) ranging from about 100 to about 250, depending upon the relative proportion of mono-olefin and multi-olefin copolymerized. The resin further usually has a melting point (by the ball and ring method) within the range between about 70° C. to 125° C. depending to a considerable extent upon the components of the copolymer and in part upon the amount of cross linkage present.

This resin is highly valuable for a paint or varnish base in combination with such materials as linseed oil, tung oil, oiticia oil, dehydrated castor oil, or the like. The resin can be heat bodied in solution in these oils by the usual varnish type "cooking" procedure, in which the resin cooks at an excellent speed to yield a very advantageous paint or varnish base. Similarly the resin, especially in the presence of fillers, such as wood flour, ground cork, cotton linters or a wide range of pigments, yields an excellent thermo plastic molding composition. The resin may also be advantageously compounded with simple polyisobutylene; with the copolymer of isobutylene, and a multiolefin known as "Butyl" or with natural rubber, or with the emulsion polymer of butadiene as such or copolymerized with styrene or acrylonitrile known as "Buna," or other of the synthetic rubbers, or with the polybutene-wax mixtures known as "Tervan," and the like. The polymer of the invention may also be compounded with the various asphalts, with the various mineral oils, with the various waxes, with the various greases and many other substances whose properties may be more or less advantageously modified by the incorporation of the polymer of the present invention. It may be noted that the polymer has a relatively very high solubility in a wide range of the non-aqueous solvents, especially the hydrocarbons broadly, and a wide range of alcohols, ethers, esters, acids, and the like, although the solubility depends to a considerable extent upon the proportion of substituents in the solvent molecule, the solubility in the simple alcohols, the simple ethers and the like being relatively lower than the solubility in hydrocarbons. Such solutions are of considerable value for a great many purposes which will be obvious to those skilled in the art.

EXAMPLE 1

A mixture was prepared consisting of approximately equal parts of an impure isobutylene stream containing approximately 80% of isobutylene, the remainder being various of the components of a $C_4$ cut indicated in the above table; with methyl chloride and butadiene; 100 parts of each being mixed together. This mixture was prepared in a reactor equipped with an adequate stirrer and reflux condenser. This material as prepared showed a boiling temperature of −20° C. The reflux condenser was cooled with solid carbon dioxide. To the mixture there was then added, in the form of a fine high pressure jet under the surface of the rapidly stirred mixture, approximately 40 parts by volume of a solution of aluminum chloride in ethyl chloride in approximately 4% concentration. This amount of catalyst was added over a period of approximately 30 minutes and the mixture was allowed to stand with vigorous stirring for 30 minutes more. At the end of this time the polymerized mixture was discharged into moderately warm water to volatilize unsaturates and to wash out the soluble catalyst salts. The slurry of resin was then drained to separate as much as possible of the water and it was heated to 250° C. to drive out all of the water and as much as possible of the light ends and volatiles. The material was then allowed to cool and was found to have a melting point (by the ball and ring method) of 75° C. The yield obtained was approximately 50% of the total amount of unsaturates in the reaction mixture.

The polymer so obtained was soluble in linseed oil to a 15 gallon length. This mixture was cooked at 292° C. for 2 hours. This treatment yielded a substantial increase in viscosity showing a good reaction between the linseed oil and polymer. The cooked mixture was then cooled, diluted with an equal volume of light naphtha (Varsol) and then filtered through a paper clothed filter. The product was a clear varnish having a Gardner color of 8. The resulting varnish was laid down in film form on test panels of wood and steel and allowed to dry. These panels were subjected to weathering tests in comparison with similar panels coated with standard varnishes and the varnish so prepared was found to be substantially superior to the standard commercial varnish compositions, since it showed a better resistance to weathering, it showed a better resistance to water, both hot and cold, showed a better resistance to sunlight, and, in addition, showed an unexpectedly high resistance to chipping, cracking and breaking, indicating a very superior toughness and an unexpected flexibility.

Example 2

A series of polymerizations were conducted on various mixtures of butadiene and a refinery $C_4$ cut using varying amounts of catalyst and varying amounts of additional propane in some instances. These polymerizations are shown in the following Table I which gives the proportion of $C_4$ cut, butadiene and other materials, the amount of aluminum chloride catalyst, the polymerization temperature, the percent yield of the total unsaturates present, the character of the resin, the percent gel or insoluble matter, the cooking time at 15 gallon length in linseed oil, the Gardner color and Gardner viscosity and the water, grease and soap resistance of films of the resulting varnish, both air dried and baked. (It may be noted that in the determination of varnish resistance, the films are rated on a 0 to 9 scale in which 0 is an excellent resistance and 9 is substantially complete failure.)

to drive off the naphtha closing with a temperature of 240° C. for 20 minutes to remove as much as possible of all of the lighter volatiles. The yield was 625 parts by weight of solid resin, approximately 69% of the total unsaturates present. The softening point of the resin was found to be 117° C. (by the ball and ring method).

*Table I*

| Run No. | Feed | Catalyst, gms. $AlCl_3$ | Reaction Temp., °C. | Yield (on total unsat.), percent | Soft Pt., °C. | Gel, percent | Cook Time, hrs. | Color-Visc. (Gardner) | Varnish Resistance, Water—Grease—Soap |
|---|---|---|---|---|---|---|---|---|---|
| 71 | +200 gms. Butadiene<br>1000 g. $C_4$ cut | 6.8 | −2 | 46.5 | very soft | 0.22 | 8 | 12—F | 2—9—9, Air Dried.<br>0—6—4, Baked. |
| 70 | +200 gms. Butadiene<br>1000 g. $C_4$ Cut | 10.2 | −1 | 55 | soft | 0.08 | 4.7 | 12—G | 2—9—9, Air Dried.<br>6—6—1, Baked. |
| 69 | +200 gms. Butadiene<br>1000 g. $C_4$ Cut | 17.0 | −2 | 63 | fairly soft | 0.12 | 6.3 | 13—I | 9—9—9, Air Dried.<br>0—1—2, Baked. |
| 68 | +400 gms. Butadiene<br>1000 g. $C_4$ Cut | 20.0 | −1.5 | 78 | 97 | | 8 | 9—K | 2—4—4, Air Dried.<br>0—0—0, Baked. |
| 67 | 1000 g. $C_4$ Cut<br>+400 gms. Butadiene<br>+500 cc. Propane | 19.5 | −15.0 | 62 | 85 | | 4.5 | 9—T | 4—5—6, Air Dried.<br>0—0—3, Baked. |
| 77 | +400 gms. Butadiene<br>1000 g. $C_4$ Cut | 20.0 | −1 | 76 | | | (over 8 hrs.). | | |
| 76 | 1000 g. $C_4$ Cut<br>+400 gms. Butadiene<br>+500 cc. Propane | 24.0 | −15.0 | 73 | | | (little over 4 hrs.). | | |

Resins made under reflux—$AlCl_3$—EtCl catalyst.
(The varnish resistance was determined upon air-dried films which were air-dried for 42 hours and upon baked films which had been baked at 125° for one hour.)

The results in the above Table I show the excellent quality of the polymer obtained by the procedure of the present invention and show the very high-grade character of varnish which can be made from the polymer.

EXAMPLE 3

A polymerization was conducted in which the overall polymerization time amounted to 1¾ hours. The polymerization mixture consisted of 1000 parts by weight of a typical crude $C_4$ cut with 472 parts by weight of butadiene without additional refrigerant. This mixture was placed in a reactor equipped with a reflux condenser cooled by solid $CO_2$. The initial temperature was −4.5° C. The mixture was polymerized by the addition thereto at a relatively low rate of speed of 430 parts by weight of a solution of aluminum chloride in ethyl chloride in a concentration of approximately 3.5 parts, 15 parts by weight of aluminum chloride being used. The following log of the polymerization was then recorded.

*Table II*

| Time | Temp., °C. | Parts of Catalyst added | Remarks |
|---|---|---|---|
| 2:20 | −4.5 | | Turned cloudy. |
| 2:30 | −5.5 | 55 | Good reflux. |
| 2:40 | −5.5 | 90 | Do. |
| 2:50 | −6.0 | 115 | Do. |
| 3:00 | −6.0 | 140 | Do. |
| 3:10 | −6.0 | 175 | Do. |
| 3:20 | −5.5 | 215 | Do. |
| 3:30 | −5.5 | 250 | Do. |
| 3:40 | −5.0 | 310 | Slowed down a little. |
| 3:50 | −5.0 | 365 | Heavy foam—sl. viscous. |
| 4:00 | −5.0 | 410 | Heavy foam—sl. viscous. |
| 4:05 | −7.5 | 430 | Very heavy foam—very viscous. |

At the end of the polymerization the mixture was discharged into warm naphtha containing a small amount of alcohol. The warm naphtha drove off most of the unsaturates and the mixture was allowed to stand for several hours to volatilize out as much as possible of the low boiling materials. The product was then washed with tap water to remove the aluminum chloride compounds and the mixture was then heated The polymer was then dissolved in linseed oil to a 15 gallon length, cooked at 565° F. for 5 hours to yield an excellent varnish which had a Gardner color of 8 and a Gardner viscosity of D.

| Varnish Evaluation | Water | Grease | Soap | |
|---|---|---|---|---|
| Air Dried, 72 Hours | 1 | 6 | 8 | Each equal to standard resin. |
| Baked 1 Hour @ 125° | 0 | 0 | 0 | None. |

EXAMPLE 4

A polymerization was made utilizing a mixture consisting of 400 parts by weight of butadiene with 1000 parts by weight of a representative $C_4$ cut as shown in the prior table. This was polymerized by the addition of 19.5 parts by weight of aluminum chloride in solution in approximately 650 parts by weight of ethyl chloride at a temperature of −15° C. to produce an amount of polymer which was approximately 62% of the total unsaturates present in the original mixture. The resulting resin had a melting point of approximately 85° C. by the ball and ring method. At the conclusion of the reaction the reaction mixture was discharged into warm water which volatilized out all of the low boiling and unpolymerized materials. These materials were recovered and analyzed as shown in the following Table IV:

*Table IV*

| Volume Per Cent of— | $C_4$ Cut | Unreacted Products |
|---|---|---|
| Propylene | 0.1 | 0.5 |
| Propane | 1.6 | |
| Isobutane | 35.2 | 33.1 |
| N-Butane | 18.3 | 25.3 |
| Isobutylene | 15.9 | 1.0 |
| Butene-1 | 12.2 | 4.1 |
| Trans butene-2 | 9.2 | 6.3 |
| Isobutene-2 | 6.2 | 4.6 |
| Butadiene | 0.3 | 4.9 |
| $C_5$ | 0.6 | |
| Ethyl chloride | 0 | 20.2 |

In this table the middle columns show the composition of the $C_4$ cut used in making up the original mixture, and the right-hand column shows the composition of the volatiles removed from the polymer. This result shows that only a small proportion of the propylene copolymerizes. The propane of course did not polymerize at all and was not tested for in this example. None of the isobutane nor the n-butane polymerized. Most of the isobutylene polymerized, most of the butene-1, a major portion of the butene-2 and the isobutene-2 polymerized. Nearly all of the added butadiene polymerized but not quite all, and there was too little $C_5$ cut present to be detected and of course the ethyl chloride catalyst solvent did not polymerize. This test shows that most of the unsaturates in the $C_4$ cut will copolymerize to a greater or less extent.

EXAMPLE 5

The invention is not limited to the use simply of the crude $C_4$ cut, but crude unsaturates generally are useable. In this aspect of the invention a polymer was prepared utilizing for the mono-olefin the crude "dimer-trimer" mixture having the following composition:

*Table V*

DI-TRIMER ANALYSIS

| Volume Per Cent | Constituent |
|---|---|
| 7.0 | Gas. |
| 3.0 | Heads: Intermediate—approx. 15%, Gas—85% Dimer. |
| 62.0 | Dimer. |
| 23.0 | Co-dimer. |
| 5.0 | Trimer. |

This material was prepared by treating the isobutylene-containing mixture with sulfuric acid to yield a primary polymerization of the isobutylene, and some of the auxiliary substances to dimer, co-dimer and trimer. The procedure consisted in absorbing the crude isobutylene in 60–65% sulfuric acid to form an acid extract. The extract was then heated to polymerize the dissolved olefin and the mixture was then diluted with water to separate the dimer and trimer.

For the polymerization reaction a mixture was prepared consisting of 450 parts by weight of butadiene with 550 parts by weight of the crude dimer-trimer and 700 parts by weight of propane. To this mixture there was then added approximately 275 parts by weight of a solution of aluminum chloride in ethyl chloride having a concentration of approximately 5.2%, the catalyst being added over a time interval of 110 minutes. During the polymerization the temperature ranged between −24.5° and −21°. The amount of polymer produced was 72% of the combined butadiene, dimer and trimer present as shown by the above analysis. At the end of the reaction there was no apparent gel formation, all of the material remaining in solution in the refrigerant and residual unsaturates. This mixture was then discharged into warm water to drive out the volatiles and the resin was separated and dried. After drying, it showed a softening point by the ball and ring method of 97° C. The polymer was dissolved in linseed oil in 15 gallon length and found to have a cook time at 547° F. of 3.8 hours to yield a Gardner color of 7 to 8 and a Gardner viscosity of F after being cut back with an equal volume of light naphtha (Varsol). The resulting varnish base was then brushed on two panels some of which were air dried and others of which were baked to yield the following evaluation:

*Table VI*

| Treatment | Varnish | | | Remarks |
|---|---|---|---|---|
| | Grease Resistance | Soap Resistance | Water Resistance | |
| Baked | 0 | 0 | 0 | Excellent—Baked 1 hr. @ 125° C. |
| Air Dried | 5 | 6 | 3 | Fair. |

These results show the excellent quality of the present invention utilizing a good grade of butadiene with a variety of crude unsaturates.

EXAMPLE 6

A series of polymerizations were run on mixtures containing varying amounts of isobutylene and varying amounts of other unsaturates such as are contained in the ordinary $C_4$ cut.

As shown in the subjoined Table VII the first polymerization was conducted on a mixture of equal parts of pure isobutylene and pure butadiene. As shown in the table, a resin was not formed. The second polymerization was run on a mixture of 1000 parts by weight of crude $C_4$ cut containing 435 parts of active olefins of which 159 parts were isobutylene, together with 200 parts of pure butadiene. As shown in the table, this polymerization yielded a soluble resin. A third polymerization was conducted using the same amount of the same cut but with double the amount of butadiene. In this instance also, an excellent soluble resin was produced. In the fourth polymerization a still higher proportion of butadiene was used and a hard soluble resin again was obtained.

*Table VII*

| Type of Feed | Approximate Temperature of Polymerization | $AlCl_3$ Cat. in Ethyl Chloride | Soluble Resin Formed |
|---|---|---|---|
| | °F. | | |
| 50% iso $C_4$+50% Butadiene | −5 | Yes | No. |
| 1000 parts $C_4$ cut (435 parts active olefin, 159 parts iso $C_4$) with 200 parts Butadiene. | −5 | Yes | Yes. |
| 100 parts $C_4$ cut (435 parts active olefin, 159 parts iso $C_4$) with 400 parts Butadiene. | −5 | Yes | Yes. |
| 1000 parts $C_4$ cut (435 parts active olefin, 159 parts iso $C_4$) with 472 parts Butadiene. | −5 | Yes | Yes. |

These and other polymerizations show that the preferred range of isobutylene is from 10% to 35% of the mixture with from 40–60% butadiene and the remainder normal olefins derived from the $C_4$ cut. It may be noted that pure isobutylene does not copolymerize with butadiene to a hard resin but yields either a rubber-like body when the butadiene is present in minor proportions, or yields merely a heavy oil when the butadiene is present in major proportions. These and other polymerizations also show that the presence of the normal olefins is highly desirable for the production of a satisfactory resin, since in their absence, the polymerization of butadiene with isobutylene alone, is unsatisfactory unless very special precautions are taken to prevent the formation of a high molecular weight rubbery substance.

Thus the present invention copolymerizes a mixture of unsaturates containing a substantial proportion to a major proportion of a multiolefin such as butadiene with a mixture of $C_4$ mono olefins preferably containing a significant amount of normal olefins with no more than 35% of isobutylene.

We claim:

1. A polymerization process comprising the steps in combination of mixing together substantially equal proportions of a multiolefin having from 4 to 14, inclusive, carbon atoms per molecule, of good purity, and a refinery $C_4$ cut composed of approximately half of its volume of propane, butane, isobutane, from 15% to 35% of isobutylene, approximately 27% of the normal butenes, and traces of $C_3$ and $C_5$ components, cooling the mixture to a temperature within the range between $+15°$ C. and $-35°$ C., and polymerizing the cold mixture by the application thereto of a Friedel-Crafts active metal halide catalyst in solution in a low freezing, non-complex forming solvent to produce a hard resin which is a non-elastomer, having a melting point (by the ball and ring method) within the range between 75° C., and 117° C., and a very light color.

2. A polymerization process comprising the steps in combination of mixing together substantially equal proportions of butadiene, and a refinery $C_4$ cut composed of approximately half of its volume of propane, butane, isobutane, from 15% to 35% of isobutylene, approximately 27% of the normal butenes, and traces of $C_3$ and $C_5$ components, cooling the mixture to a temperature within the range between $+15°$ C. and $-35°$ C. and polymerizing the cold mixture by the application thereto of a Friedel-Crafts active metal halide catalyst in solution in a low freezing, non-complex forming solvent to produce a hard resin which is a non-elastomer, having a melting point (by the ball and ring method) within the range between 75° C., and 117° C., and a very light color.

3. A polymerization process comprising the steps in combination of mixing together substantially equal proportions of butadiene, and a refinery $C_4$ cut composed of approximately half of its volume of propane, butane, isobutane, from 15% to 35% of isobutylene, approximately 27% of the normal butenes, and traces of $C_3$ and $C_5$ components, cooling the mixture to a temperature within the range between $+15°$ C. and $-35°$ C. and polymerizing the cold mixture by the application thereto of a solution of aluminum chloride in methyl chloride to produce a hard resin which is a non-elastomer, having a melting point (by the ball and ring method) within the range between 75° C., and 117° C., and a very light color.

4. A polymerization process comprising the steps in combination of mixing together substantially equal proportions of a multiolefin having from 4 to 14, inclusive, carbon atoms per molecule, of good purity, and a refinery $C_4$ cut composed of approximately half of its volume of propane, butane, isobutane, from 15% to 35% of isobutylene, approximately 27% of the normal butenes, and traces of $C_3$ and $C_5$ components modified by the addition of significant amounts of a $C_3$ cut containing from 15% to 30% of propylene, and the remainder substantially of propane, cooling the mixture to a temperature within the range between $+15°$ C. and $-35°$ C., and polymerizing the cold mixture by the application thereto of a Friedel-Crafts active metal halide catalyst in solution in a low freezing, non-complex forming solvent to produce a hard resin which is a non-elastomer, having a melting point (by the ball and ring method) within the range between 75° C., and 117° C., and a very light color.

HELMUTH G. SCHNEIDER.
DAVID W. YOUNG.

REFERENCES CITED

The following references are of record in the file of this patent:

UNITED STATES PATENTS

| Number | Name | Date |
|---|---|---|
| 1,982,708 | Thomas et al. | Dec. 4, 1934 |
| 2,092,295 | van Peski | Sept. 7, 1937 |
| 2,142,980 | Huijser | Jan. 3, 1939 |
| 2,172,403 | Otto | Sept. 12, 1939 |
| 2,278,982 | Frolich | Apr. 7, 1942 |